United States Patent Office 3,350,444
Patented Oct. 31, 1967

3,350,444
PROCESS FOR SEPARATING CYCLOHEXANE OXIDATION PRODUCTS
John H. Bonfield, East Aurora, and Allen W. Sogn, Williamsville, N.Y., assignors to Allied Chemical Corporation, New York, N.Y., a corporation of New York
No Drawing. Filed Sept. 9, 1965, Ser. No. 486,202
15 Claims. (Cl. 260—531)

The present invention relates to a novel process for recovering organic oxidation products. More particularly it relates to separating oxygen-containing products from a reaction mixture obtained by oxidation of cyclohexane with a oxygen-containing gas. It is specifically concerned with an improved method of extracting the oxidation products of cyclohexane from such a reaction mixture.

It is known to oxidize cyclohexane in the liquid phase with air or other oxygen-containing gas to provide a mixture of oxygenated organic compounds which are important precursors of valuable polymers such as polyepsilon caprolactam and polyhexamethylene adipamide. The products of the oxidation include cyclohexanone, cyclohexanol together with minor amounts of other oxygenated compounds i.e. carboxylic acids, e.g. adipic acid, adipaldehydic acid, epsilon hydroxycaproic acid, ethers, e.g. cyclohexenylcyclohexyl ether, glycols such as cyclohexane diol 1,2; lactones, e.g. epsilon caprolactone; and esters such as dicyclohexyl adipate. Since the foregoing oxidation products of cyclohexane are in general more readily oxidized than the parent hydrocarbon, the cyclohexane charge is only partially oxidized, e.g. to an extent of about 2–16%, so that the resulting oxidation mixture contains large amounts of cyclohexane. According to the prior art procedures the unreacted cyclohexane and oxygenated reaction products are separated and the latter are then either processed to recover cyclohexanone and cyclohexanol, the precursors, of polyepsilon caprolactam (nylon 6) or, oxidized by a nitrogenous oxidizing agent, e.g. aqueous nitric acid to provide adipic acid, a precursor of polyhexamethylene adipamide (nylon 6, 6) together with a by-product comprising glutaric and succinic acids. The greatest disadvantage in prior art procedures has been separation of unreacted cyclohexane from the mixture of oxygenated products. It has been proposed to remove the cyclohexane by distillation with or without steam. However, this procedure entails an exceedingly large scale and costly distillation operation and which may result in loss of cyclohexanone via condensation of cyclohexanone and loss of cyclohexanol and acids via ester formation. It has also been proposed to selectively extract cyclohexanone and cyclohexanol from the oxidation reaction mixture by first extracting the ketone and alcohol with an aqueous salt of an aromatic sulfonic acid and thereafter extracting the alcohol and ketone from the first extract by a solvent immiscible with the first extractant, e.g. tricresyl phosphate or dibutyl phthalate. The cyclohexanone and cyclohexanol are then recovered by distillation of the second extractant. This procedure suffers from the obvious disadvantages of (1) requiring two different extractants, (2) employing costly extractants and (3) separating only cyclohexanone and cyclohexanol from the mixture of cyclohexane oxidation products.

It is an object of the present invention to devise an economical and efficient method of separating the oxygen-containing organic products of the oxidation of cyclohexane with air or other oxygen-containing gases.

This and other objects and advantages of our invention will be apparent from the following description of the invention.

We have now found that the foregoing disadvantages of the prior art are overcome and oxygen-containing organic products are efficiently separated from the cyclohexane oxidation reaction mixture by the novel process which comprises the steps of extracting the reaction mixture with a member of the group consisting of molten succinic acid, molten glutaric acid, molten adipic acid, and aqueous solutions of said acids containing at least about 60 weight percent of the acid, preferably an aqueous solution containing about 70–95 weight percent acid is employed, and thereafter separating the acid extract of the oxygen-containing organic products from the residual reaction mixture.

The present novel process is carried out by intimately contacting the cyclohexane oxidation reaction mixture with the acid extractant advantageously with strong agitation. The mixture is allowed to stratify and the lower acid extract layer which separates is recovered from the upper cyclohexane raffinate layer by conventional means such as, decanting the upper cyclohexane raffinate. The recovered cyclohexane can be recycled to the oxidation stage to provide a fresh feedstock for the extraction after oxidation thereof.

While the amount of acid extractant required in the present process will vary somewhat depending upon the amount of oxygen-containing organic products in the cyclohexane oxidation reaction mixture and upon the particular acid extractant used, we generally employ about 0.1 to 4.0 part and preferably 0.2–2.0 part of acid extractant per part by weight of the cyclohexane oxidation reaction mixture. Use of about 1.7 parts extractant per part by weight of cyclohexane oxidation reaction mixture affords an especially good result and hence is to be preferred. The novel extraction process can be carried out concurrently or countercurrently in batchwise or continuous fashion employing one or more extraction stages and utilizing any of the conventional apparatus employed in liquid-liquid extraction such as, a single agitated vessel in a batch process or agitated countercurrent extractors in a continuous process.

The present novel process is effected at temperatures and pressures of sufficient elevation to avoid boiling cyclohexane (B.P. 81° C. at atmospheric pressure) or water and to maintain the acid extractant as a single homogeneous liquid phase. Thus, when employing molten glutaric acid (M.P. 97.5° C.) adipic acid (M.P. 153° C.) and succinic acid (M.P. 182° C.) and mixtures thereof as acid extractant, the process is carried out at a temperature at least above the melting point of the acid extractant in a closed system, under a sufficient superatmospheric pressure, advantageously autogenous pressure to avoid boiling the cyclohexane and water in the extraction mixture.

Similarly when employing as extractants aqueous solutions of adipic and succinic acids, which are poorly soluble in water at temperatures below 80° C., extraction is effected under superatmospheric pressure and at temperatures above about 100° C. in order to provide aqueous extractant solutions containing at least about 60 weight percent of the acid.

In general, use of temperatures in the present process above about 200° C. is to be avoided so as to minimize esterification of the cyclohexanol present in the cyclohexane oxidation product.

In order to avoid use of extreme temperatures and superatmospheric pressures, we prefer to use as the acid extractant aqueous solutions of glutaric acid. The preferred extractants can be employed under atmospheric pressure at temperatures in the range of about 50° to 80° C. An especially good result is obtained according to the present invention in extracting cyclohexane oxidation products with 90–95 weight percent aqueous glutaric acid at about 70–75° C.

The acid extract of oxygen-containing products recovered in our novel extraction procedure is further treated to obtain either cyclohexanone and cyclohexanol or adipic acid.

According to a preferred embodiment of our invention the oxygen-containing products of the acid extract are converted to adipic acid by means of a conventional oxidation technique which comprises heating the extract with aqueous nitric acid in the presence of a metal compound-based oxidation catalyst such as the compounds of vanadium, manganese or copper. The oxidized mass is cooled to ambient temperature and the adipic acid which precipitates is recovered, e.g. by filtration. The residual reaction liquor which contains adipic, glutaric, and succinic acids may be then treated in accordance with the process of copending U.S. patent application Ser. No. 174,277 now Patent No. 3,290,369, to separate and recover the aforementioned acids. Recovered acid, e.g. glutaric acid, can be recycled to the extraction stage of the process.

According to another embodiment of the invention, cyclohexanone and cyclohexanol are recovered from the acid extract by distillation, advantageously with steam. The steam distillate is treated with aqueous base according to known methods to saponify esters which may be present and fractionated to recover pure cyclohexanone and cyclohexanol. The steam distilland is concentrated by evaporation or distillation of water to obtain an aqueous residue containing the acid extractant which can be recycled to the extraction. Before being recycled, the concentrated distilland is advantageously treated with nitric acid followed by treatment in accordance with aforementioned U.S. application, S.N. 174,277 in order to convert any non-acidic cyclohexane oxidation products present in the distilland to adipic, glutaric and succinic acids and to recover latter acids.

The process of the invention has several advantages over prior art procedures as will be obvious to those skilled in the art. Firstly, it provides an efficient method for recovery of cyclohexane oxidation products which avoids large scale distillation of unreacted cyclohexane, secondly it employs only one extractant, thirdly it provides for recovery of substantially all of the organic oxidation products of cyclohexane and finally it utilizes inexpensive extractants which are readily and economically obtained by oxidation of cyclohexane or by oxidation of cyclohexane oxidation products.

In the following examples which serve to illustrate our invention, parts and percentages unless otherwise noted are by weight and temperatures are in degrees centigrade.

*Example*

Part A.—The reaction mixture (595 parts), which is obtained via partial liquid phase air oxidation of cyclohexane and which contains 520 parts (87.4%) cyclohexane, 23.9 parts (4.03%) cyclohexanone, 24.3 parts (4.08%) cyclohexanol, 26.8 parts (4.49%) of other oxygen containing organic compounds including cyclohexenyl cyclohexyl ethers, epsilon caprolactone, cyclohexane diol-1,2, cyclohexyl esters such as cyclohexyladipate 0.0886 equivalents of carboxylic acids such as adipic acid, adipaldehydic acid and epsilon hydroxy caproic acid, is extracted successively at 72° at atmospheric pressure with four 250 part aqueous solutions containing 232 parts (92.7%) glutaric acid. The weight and composition of the cyclohexane raffinate and the weights of the glutaric acid extract obtained in each extraction are presented in Table I.

The glutaric acid extracts are combined giving 1093 parts of an aqueous mixture containing 22.8 parts cyclohexanone 24.05 parts of cyclohexanol and 22.8 parts of other oxygen-containing products. The cyclohexane raffinate (487 parts) is reserved for liquid phase air oxidation to provide fresh feedstock for extraction as described above.

Part B.—A 546.5 part portion of the aqueous glutaric extract obtained in Part A above is steam distilled. The distillate separates into an upper organic layer and a lower aqueous layer, the latter layer being continuously recycled to the still. The distillation is continued until no organic material distills. The organic layer and aqueous layer which are separated together contain 11 parts of cyclohexanone (96.5% recovery based on the cyclohexanone content of the charge to the steam distillation), 12.2 parts cyclohexanol (101.5% recovery) including cyclohexanol formed by hydrolysis of cyclohexyl esters in the distillation, and 3.53 parts of other oxygen-containing products (31% recovery). The aqueous distilland which contains 927 parts of glutaric acid is recovered and reserved for extracting a fresh cyclohexane oxidation mixture according to the process described in Part A above.

Part C.—A 546.5 part portion of the aqueous glutaric acid extract of Part A above is oxidized for 20 minutes at 80–90° with 167.3 parts of 70% aqueous nitric acid in the presence of 0.167 part copper metal and 0.0167 part of ammonium meta vanadate to give a mixture containing 28 parts of adipic acid. The reaction mass is cooled to ambient temperature and the adipic acid which precipitates is recovered by filtration. The filtrate containing glutaric acid, succinic acid and residual adipic acid is recovered and reserved for treatment according to the procedure of above mentioned U. S. application S.N. 174,277 to separate and recover the acids. The aqueous glutaric acid recovered can be utilized in extracting a fresh supply of cyclohexane oxidation product in accordance with the process of Part A.

The foregoing examples have been presented by way of illustration and not of limitation; it is recognized that modifications and changes may be made without departing from the scope or spirit of the invention.

We claim:

1. A process for separating oxygen-containing organic products, resulting from the oxidation of cyclohexane, from a mixture of said oxygen-containing organic products and cyclohexane which comprises intimately contacting said mixture with from about 0.1 to 4.0 parts per part by weight of said mixture of an acid extractant selected from the group consisting of molten succinic, glutaric

TABLE I

| Extraction | Parts of Cyclohexane Raffinate | Parts of Glutaric Acid Extract | Composition of Cyclohexane Raffinate ||||  |
| --- | --- | --- | --- | --- | --- | --- | --- |
|  |  |  | Percent Cyclohexane | Percent Cyclohexanol | Percent Cyclohexanone | Percent Oxygen-Containing Products (Other than Cyclohexanol and Cyclohexanone) | Equivalents of Acid (X10⁻³) |
| 1 | 539 | 306 | 94.4 | 2.0 | 1.11 | 2.46 | 15.3 |
| 2 | 509 | 273 | 97.2 | 0.93 | 0.18 | 1.68 | 3.0 |
| 3 | 494 | 260 | 98.57 | 0.59 | 0.11 | 0.73 | 0.52 |
| 4 | 487 | 254 | 98.87 | 0.30 | 0.02 | 0.81 | 0.25 | and adipic acids and mixtures thereof and aqueous solutions of said acids containing at least about 60 weight percent of acid under conditions of temperature and pressure sufficient to avoid boiling cyclohexane and water and to maintain said extractant as a single homogeneous phase, to form an acid extract containing said oxygen-containing organic products, separating said acid extract from the cyclohexane raffinate and thereafter recovering the oxygen-containing organic products from said extract.

2. The process of claim 1 wherein said contacting step is performed at temperatures below about 200° C.

3. The process of claim 1 wherein said acid extractant is succinic acid.

4. The process of claim 1 wherein said acid extractant is glutaric acid.

5. The process of claim 1 wherein said acid extractant is adipic acid.

6. The process of claim 1 wherein said acid extractant is employed in molten form.

7. The process of claim 1 wherein said acid extractant is employed in the form of an aqueous solution thereof containing at least about 60 weight percent acid.

8. The process of claim 1 wherein said acid extractant is an aqueous solution of glutaric acid containing 70–95 weight percent glutaric acid.

9. The process of claim 1 wherein said oxygen-containing organic products contains cyclohexanone and cyclohexanol which are recovered from said acid extract by distillation.

10. The process of claim 1 wherein said oxygen-containing organic products are converted to adipic acid and are recovered from said acid extract by heating the acid extract in the presence of nitric acid and a metal compound-based oxidation catalyst, thereafter cooling the reaction mass to effect precipitation of adipic acid and recovering said adipic acid precipitate therefrom.

11. The process of claim 1 wherein the cyclohexane raffinate is recycled to the oxidation stage.

12. The process for separating oxygen-containing organic products, resulting from the oxidation of cyclohexane, from a mixture of said oxidation products and cyclohexane which comprises intimately contacting said mixture with 1.7 parts per part by weight of said mixture of a member selected from the group consisting of molten glutaric acid or an aqueous solution of glutaric acid containing at least about 60 weight percent of acid at a temperature of about 50° to 80° C. and atmospheric pressure to form an acid extract containing said oxygen-containing organic products, separating said acid extract from the cyclohexane raffinate, thereafter converting said oxygen-containing organic products to adipic acid by heating said acid extract in the presence of nitric acid and a metal compound-based oxidation catalyst, cooling the reaction mass to effect precipitation of adipic acid and recovering said adipic acid precipitate therefrom.

13. The process of claim 12 wherein said contacting step is performed at temperatures ranging from 70–75° C.

14. The process of claim 12 wherein said glutaric acid is in the form of an aqueous solution thereof containing 90–95 weight percent glutaric acid.

15. The process of claim 12 wherein said cyclohexane raffinate is recycled to the oxidation stage.

References Cited

FOREIGN PATENTS 824,046  11/1959  Great Britain.

LEON ZITVER, *Primary Examiner.*

M. M. JACOB, *Assistant Examiner.*